US012627077B2

(12) United States Patent
Wu et al.

(10) Patent No.: US 12,627,077 B2
(45) Date of Patent: May 12, 2026

(54) ANTENNA MODULE WITH DIFFERENT TYPE ANTENNA AND ELECTRONIC DEVICE EMPLOYING ANTENNA

(71) Applicants: Futaijing Precision Electronics (Yantai) Co., Ltd., Yantai (CN); HON HAI PRECISION INDUSTRY CO., LTD., New Taipei (TW)

(72) Inventors: Ching-Ling Wu, New Taipei (TW); Hsiang-Neng Wen, New Taipei (TW); Chih-Wei Liao, New Taipei (TW); Yung-Yu Tai, New Taipei (TW); Ping-Hsun Ho, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 38 days.

(21) Appl. No.: 18/430,999

(22) Filed: Feb. 2, 2024

(65) Prior Publication Data

US 2025/0192450 A1 Jun. 12, 2025

(30) Foreign Application Priority Data

Dec. 7, 2023 (CN) ......................... 202323335110.7

(51) Int. Cl.

*H01Q 21/28* (2006.01)
*H01Q 9/04* (2006.01)
*H01Q 13/10* (2006.01)

(52) U.S. Cl.

CPC ........... *H01Q 21/28* (2013.01); *H01Q 9/0421* (2013.01); *H01Q 13/10* (2013.01)

(58) Field of Classification Search

CPC ....... H01Q 21/28; H01Q 9/0421; H01Q 13/10
See application file for complete search history.

(56) References Cited

U.S. PATENT DOCUMENTS

2023/0145636 A1* 5/2023 Seo .......................... H01Q 1/38 343/702
2024/0079767 A1* 3/2024 Lin ...................... H01Q 1/2283
2025/0112370 A1* 4/2025 Chang .................... H01Q 9/045

FOREIGN PATENT DOCUMENTS

CN 110011077 A * 7/2019 ............. H01Q 5/307
EP 2645477 A1 * 10/2013 ............. H01Q 5/385

OTHER PUBLICATIONS

CN_110011077_A_I_English_Translation (Year: 2019).*

* cited by examiner

*Primary Examiner* — Regis J Betsch
*Assistant Examiner* — Jose A. Miranda Gonzalez
(74) *Attorney, Agent, or Firm* — ScienBiziP, P.C.

(57) ABSTRACT

An antenna module using two antennas with different radiation mechanisms for signal transmitting and receiving includes a substrate, a first antenna, and a second antenna. A first surface of the substrate includes a first clearance area and a second clearance area, the first clearance area is located in a first corner area of the first surface, and the second clearance area is located in a second corner area of the first surface. The first antenna includes a first radiation portion located in the first clearance area, and the second antenna includes a second radiation portion located in the second clearance area. An antenna type of the first antenna is different from an antenna type of the second antenna, and the first antenna and the second antenna are configured to transmit and receive signals of the same frequency. An electronic device is also disclosed.

18 Claims, 9 Drawing Sheets

ANTENNA MODULE WITH DIFFERENT TYPE ANTENNA AND ELECTRONIC DEVICE EMPLOYING ANTENNA

TECHNICAL FIELD

The subject matter herein generally relates to antenna structures.

BACKGROUND

With the continuous development of wireless communication technology, a demand for antennas for wireless communication is increasing. Multi-input multi-output (MIMO) antenna system includes two or more antennas, compared with the traditional single antenna operation system, MIMO antenna system has a characteristics of improving a transmission speed, a receiving range, and a credibility of the system.

In MIMO antenna system, in order to decrease a coupling effect between the antennas, the conventional practice is mostly to increase the distance between the antennas to increase the isolation between the antennas, so as to reduce the coupling effect. However, with a development trend of a miniaturization of electronic equipment, an internal space of the electronic equipment is limited, resulting in the limited distance between the antennas, in order to meet isolation requirements between antennas, there is room for improvement.

BRIEF DESCRIPTION OF THE DRAWINGS

Implementations of the present disclosure will now be described, by way of embodiments, with reference to the attached figures.

DETAILED DESCRIPTION

Figure 1:
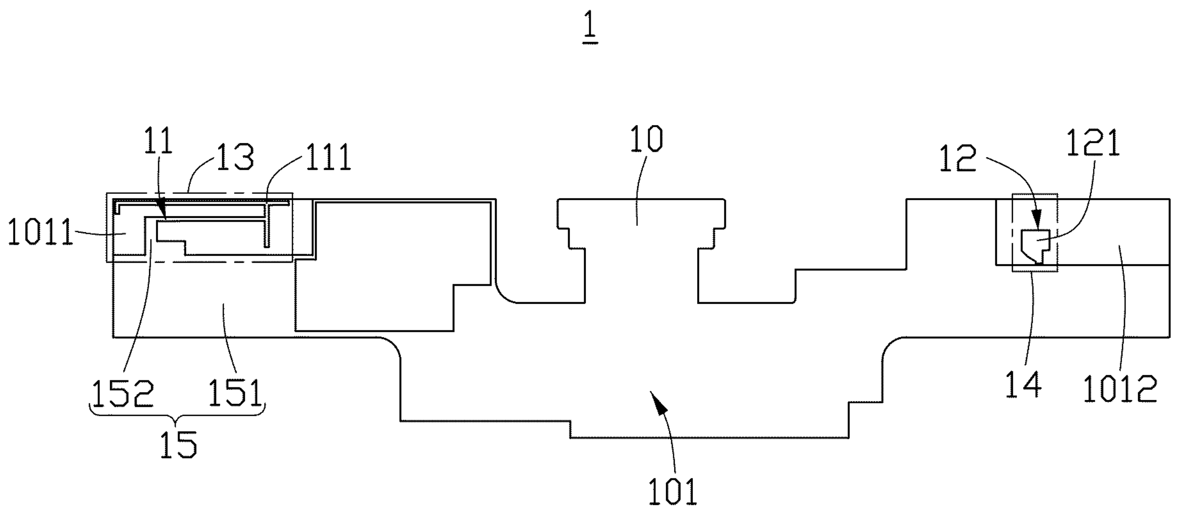
FIG. 1 is a front structure diagram illustrating an antenna module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to “an” or “one” embodiment in this disclosure are not necessarily to the same embodiment, and such references mean “at least one”.

Several definitions that apply throughout this disclosure will now be presented.

The term “coupled” is defined as connected, whether directly or indirectly through intervening components, and is not necessarily limited to physical connections. The connection can be such that the objects are permanently connected or releasably connected. The term “comprising,” when utilized, means “including, but not necessarily limited to”; it specifically indicates open-ended inclusion or membership in the so-described combination, group, series, and the like.

FIG. 1 illustrates one exemplary embodiment of an antenna module 1. The antenna module 1 includes a substrate 10, a first antenna 11, and a second antenna 12. The first antenna 11 and the second antenna 12 are arranged on the substrate 10. The first antenna 11 and the second antenna 12 may be antennas printed on the substrate 10.

Figure 4:
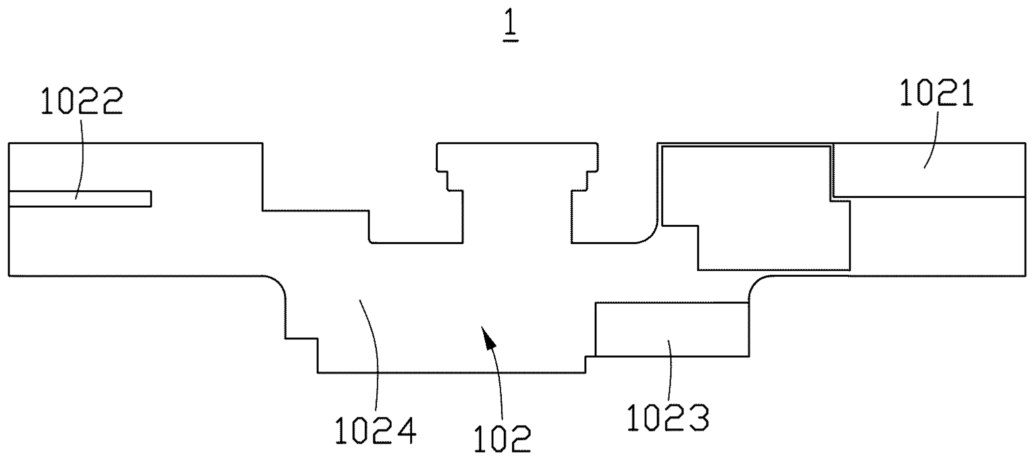
FIG. 4 is a back structure diagram illustrating the antenna module according to an embodiment of the present disclosure.

In one embodiment, the substrate 10 include a first surface 101 and a second surface 102 (as shown in FIG. 4). The first surface 101 is arranged opposite to the second surface 102. The first surface 101 includes a first clearance area 1011 and a second clearance area 1012, the first clearance area 1011 is located in a first corner area of the first surface 101, and the second clearance area 1012 is located in a second corner area of the first surface 101.

In one embodiment, clearance areas can be areas on the substrate 10 that are not poured copper, and corner areas can be areas on the substrate 10 that are enclosed by two adjacent sides.

In one embodiment, the first antenna 11 includes a first radiation portion 111, and the first radiation portion 111 is located in the first clearance area 1011. The second antenna 12 includes a second radiation portion 121, and the second radiation portion 121 is located in the second clearance area 1012. Because of an isolation between the two antennas (first antenna 11 and second antenna 12) is related to a distance between the two antennas, as shown in FIG. 1, in order to improve the isolation between the first antenna 11 and the second line 12, the first clearance area 1011 and the second clearance area 1012 can be two corner areas on the first surface 101 that are relatively far apart.

In one embodiment, an antenna type of the first antenna 11 is different from an antenna type of the second antenna 12, and the first antenna 11 and the second antenna 12 are configured to transmit and receive first signals of the same frequency. For example, the first antenna 11 and the second line 12 are configured for transmitting and receiving signals from 2.4 GHz to 2.5 GHZ, and the first antenna 11 and the second antenna 12 can be used as wireless fidelity (Wi-Fi) antennas for transmitting and receiving Wi-Fi signals. Different types of antennas may be refer to the first antenna 11 and the second line 12 having different radiation mechanisms. For example, the first antenna 11 is an inverted-F antenna, and the second antenna 12 is a slot antenna.

The antenna module 1 includes two antennas with different radiation mechanisms, reducing ab interference between the two antennas, and the radiation portions of the two antenna are arranged in the clearance areas of the substrate 10, to improve an isolation between the two antennas in a space with a small distance.

Figure 2:
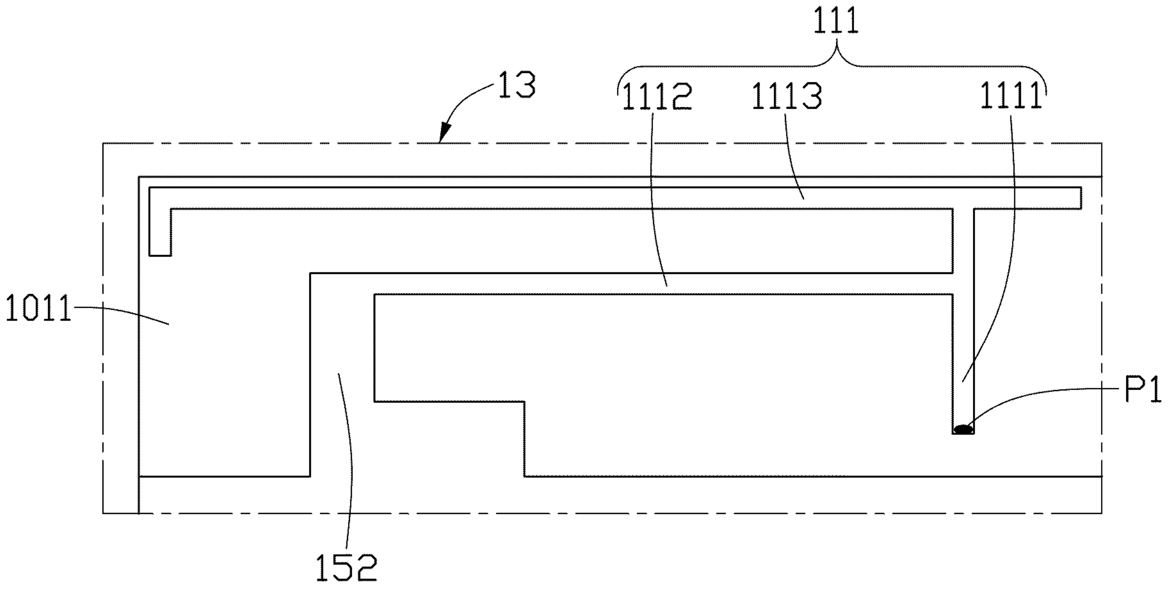
FIG. 2 is a structure diagram illustrating a first radiation portion according to an embodiment of the present disclosure.

Referring to FIG. 2, shows a zoom-in view of a first region 13 of FIG. 1. The first radiation portion 111 may include a first strip portion 1111, a second strip portion 1112, and a third strip portion 1113. A first end of the first strip portion 1111 is configured for feeding second signals, a second end of the first strip portion 1111 is coupled to the third strip portion 1113. A first end of the second strip portion 1112 is coupled to the first strip portion 1111. The first strip portion 1111 and the second strip portion 1112 are both long strip portions, for example, shapes of the first strip portion 1111 and the second strip portion 1112 are both rectangles.

The third strip portion 1113 is a L-shaped portion, and the first strip portion 1111 and a long side of the third strip portion 1113 are form a T-shape portion. The first antenna 11 adopts the first radiation portion 111 of the above-mentioned structure to achieve a better radiation performance.

In one embodiment, the first end of the first strip portion 1111 is provided with a first signal feed point P1, the first signal feed point P1 is configured for feeding the second signals. The first signal feed point P1 may be coupled to a signal transceiver by a trace on the substrate 10, the signal transceiver has functions of transmitting signals through the first antenna 11, and processing signals received by the first antenna 11.

In one embodiment, a first feed portion for feeding the second signals may be arranged on the first surface 101, for example, the first feed portion can be printed on the first surface 101. The first feed portion is coupled to the first end of the first strip portion 1111. The first feed portion can be coupled to the signal transceiver via a trace.

In one embodiment, referring to FIG. 1, the first surface 101 may further include a metal layer 15, the metal layer 15 can be copper pour layer. The metal layer 15 includes a base portion 151 and a connecting portion 152, and the connecting portion 152 can be a L-shaped portion, the connecting portion 152 can be located in the first clearance area 1011.

In one embodiment, a second end of the second strip portion 1112 is coupled to an end of the connecting portion 152, to reduce a coupling effect between the first antenna 11 and the second antenna 12.

Figure 3:
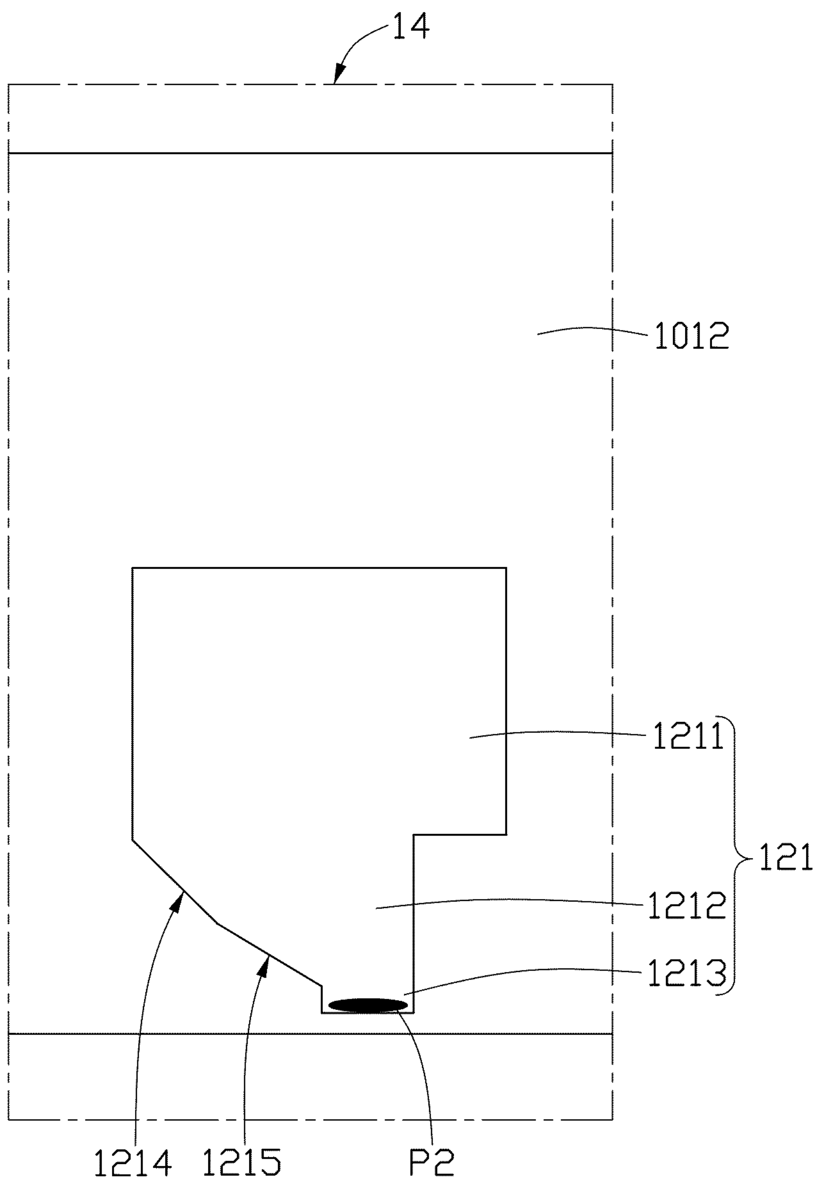
FIG. 3 is a structure diagram illustrating a second radiation portion according to an embodiment of the present disclosure.

Referring to FIG. 3, shows a zoom-in view of a second region 14 of FIG. 1. the second radiation portion 121 may include a first rectangular portion 1211, a trapezoidal portion 1212, and a second rectangular portion 1213. The trapezoidal portion 1212 is located between the first rectangular portion 1211 and the second rectangular portion 1213. An upper bottom of the trapezoidal portion 1212 is a long side of the second rectangular portion 1213, and a lower bottom of the trapezoidal portion 1212 is a part of a long side of the first rectangular portion 1111. For example, the lower bottom of the trapezoidal portion 1212 coincides with the long side of the first rectangular portion 1211, and a length of the lower bottom of the trapezoidal portion 1212 is less than a length of the long side of the first rectangular portion 1211.

In one embodiment, the trapezoidal portion 1212 may include two right trapezoidal portions, straight waists of the two right trapezoidal portions are connected, and inclination angles of oblique waists of the two right trapezoidal portions are different. Referring to FIG. 3, the trapezoidal portion 1212 may include a first right trapezoidal portion 1214 and a second right trapezoidal portion 1215, and inclination angles of oblique waists of the first right trapezoidal portion 1214 and the second right trapezoidal portion 1215 are different.

In one embodiment, the second rectangular portion 1213 is provided with a second signal feed point P2, the second signal feed point P2 is configured for feeding the second signals. The second signal feed point P2 may be coupled to the signal transceiver by a trace on the substrate 10.

In one embodiment, a second feed portion for feeding the second signals may be arranged on the first surface 101, for example, the second feed portion can be printed on the first surface 101. The second feed portion may be coupled to a long side of the second rectangular portion 1213 away from the trapezoidal portion 1212. The second feed portion can be coupled to the signal transceiver via a trace. Shapes and sizes of the first feed portion and the second feed portion can be defined according to an actual application.

Figure 5:
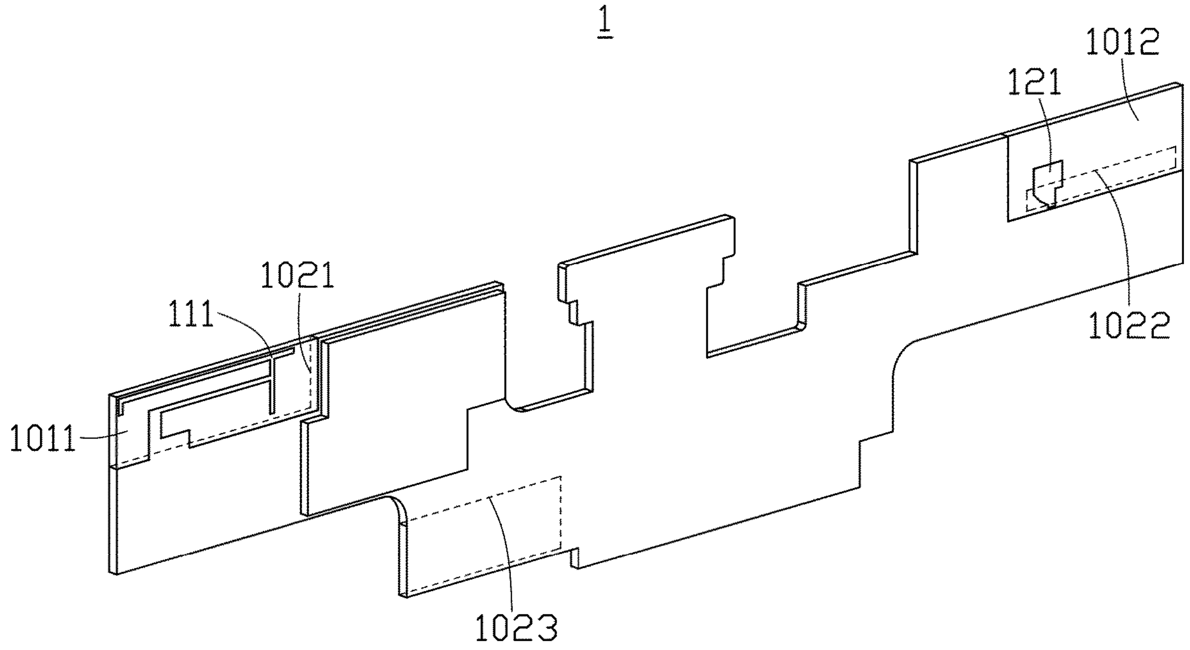
FIG. 5 is a stereo structure diagram illustrating the antenna module according to an embodiment of the present disclosure.

Referring to FIGS. 4 and 5, the second surface 102 includes a third clearance area 1021 and a fourth clearance area 1022. A projection of the first radiation portion 111 on the second surface 102 may be fall in the third clearance area 1021, and a projection of the fourth clearance area 1022 on the first surface 101 may be fall in the second clearance area 1012.

In one embodiment, the first clearance area 1011 is arranged opposite to the third clearance area 1021, and the first clearance area 1011 and the third clearance area 1021 have the same size, for example, have the same length and width.

In one embodiment, the second clearance area 1012 is arranged opposite to the fourth clearance area 1022. The fourth clearance area 1022 may be a rectangular groove arranged on the second surface 102, and the projection of the fourth clearance area 1022 on the first surface 101 overlaps with the second radiating portion 121. For example, as shown in FIG. 5, projections of the trapezoidal portion 1212 and the second rectangular portion 1213 on the second surface 102 falls in the fourth clearance area 1022.

In one embodiment, a length of the substrate 10 may be 135 mm, a maximum width of the substrate 10 may be 30 mm, and a size of the fourth clearance area 1022 is 18 mm*2 mm (length*width).

In one embodiment, referring to FIG. 4, in addition to include the third clearance area 1021 and the fourth clearance area 1022, the second surface 102 further includes a fifth clearance area 1023 and a copper laying area 1024. The fifth clearance area 1023 is located between the third clearance area 1021 and the fourth clearance area 1022. A length of the fourth clearance area 1022 is less than a length of the second clearance area 1012, and a width of the fourth clearance area 1022 can be set according to an actual radiation requirement of the second antenna 12.

Figure 6:
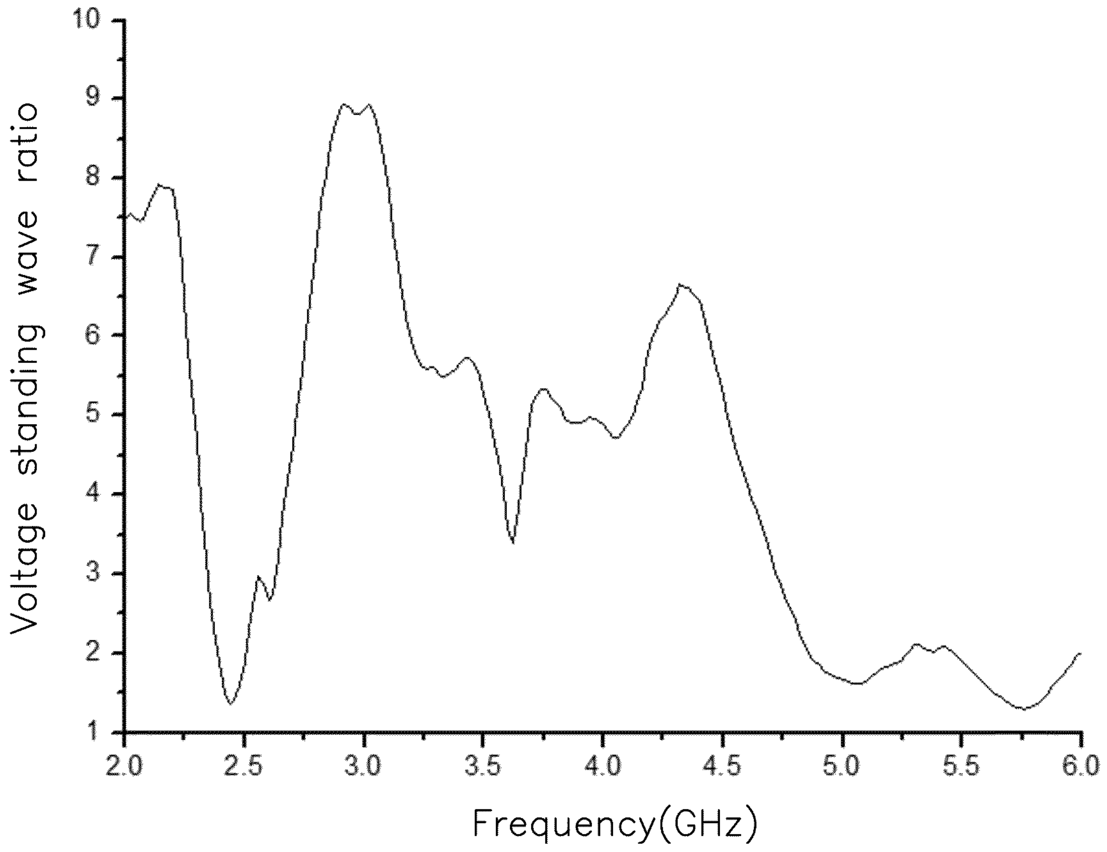
FIG. 6 is a graph diagram illustrating a voltage standing wave ratio of a first antenna according to an embodiment of the present disclosure.

Referring to FIG. 6, shows a graph of a voltage standing wave ratio (VSWR) of the first antenna 11. As shown in FIG. 6, the first antenna 11 has a small VSWR between 2.4 GHz and 2.5 GHz.

Figure 7:
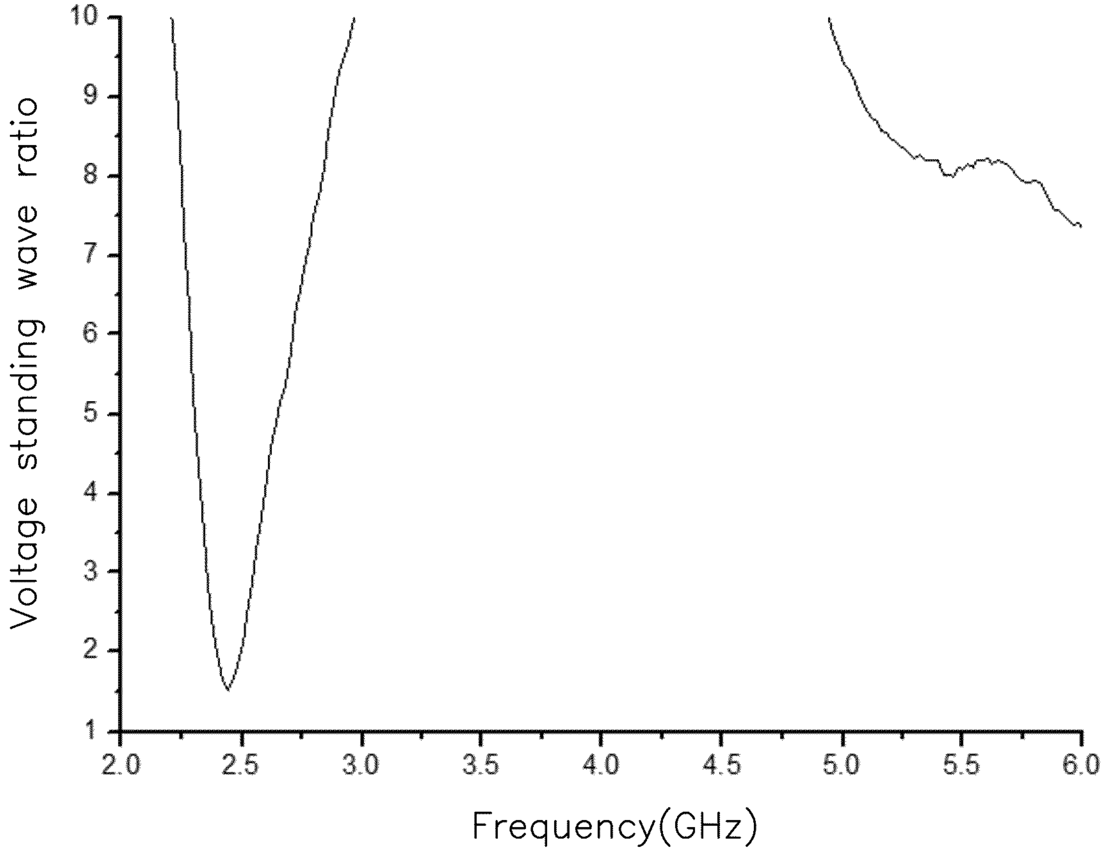
FIG. 7 is a graph diagram illustrating a voltage standing wave ratio of a second antenna according to an embodiment of the present disclosure.

Referring to FIG. 7, shows a graph of a VSWR of the second antenna 12. As shown in FIG. 7, the second antenna 12 has a small VSWR between 2.4 GHz and 2.5 GHz.

Figure 8:
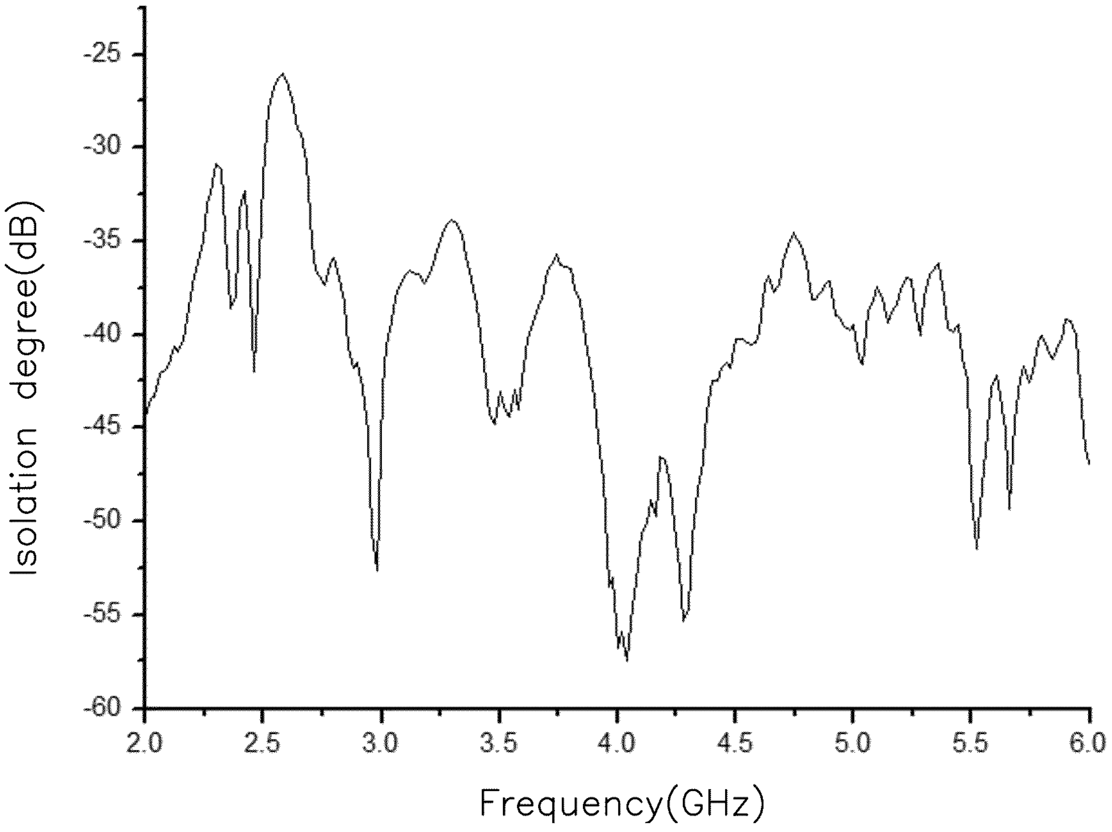
FIG. 8 is a graph diagram illustrating an isolation degree between the first antenna and the second antenna according to an embodiment of the present disclosure

Referring to FIG. 8, shows a graph of an isolation degree between the first antenna 11 and the second antenna 12. As shown in FIG. 8, when the first antenna 11 and the second line 12 work in a frequency band between 2.4 GHz and 2.5

GHZ, the isolation degree is less than-25 dB, illustrating an isolation effect between the first antenna 11 and the second line 12 is fine.

Figure 9:
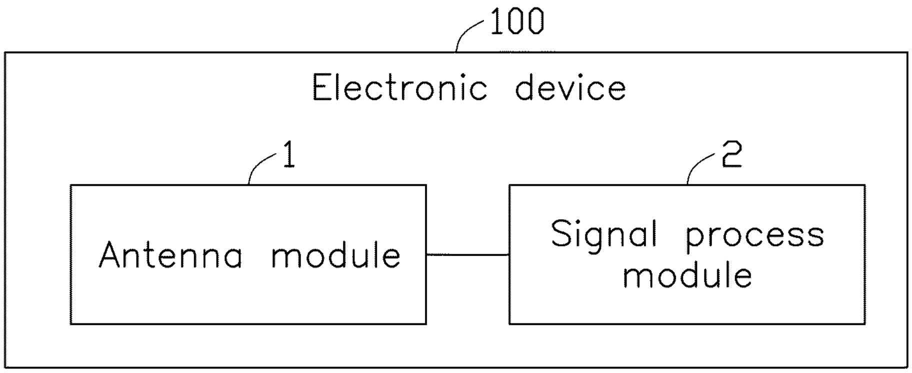
FIG. 9 is a block diagram illustrating an electronic device according to an embodiment of the present disclosure.

FIG. 9 illustrates one exemplary embodiment of an electronic device 100, the electronic device 100 may include an antenna module 1 and a signal process module 2. The antenna module 1 may be a module as described in the above embodiment. The antenna module 1 is coupled to the signal process module 2, the signal process module 2 may include a signal transceiver for transmitting signals through the antenna module 1, and processing signals received by the antenna module 1.

The electronic device 100 may transmit and receive wireless signals through the antenna module 1. The electronic device 100 may be a mobile phone, a tablet computer, a notebook computer, a smart wearable device, etc.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna module, comprising:

a substrate, a first surface of the substrate comprising a first clearance area and a second clearance area, wherein the first clearance area is located in a first corner area of the first surface, and the second clearance area is located in a second corner area of the first surface;

a first antenna arranged on the substrate, the first antenna comprising a first radiation portion located in the first clearance area; and a second antenna arranged on the substrate, the second antenna comprising a second radiation portion located in the second clearance area;

wherein an antenna type of the first antenna is different from an antenna type of the second antenna, and the first antenna and the second antenna are configured to transmit and receive first signals of the same frequency.

2. The antenna module of claim 1, wherein the first antenna is an inverted-F antenna, and the second antenna is a slot antenna.

3. The antenna module of claim 1, wherein the first radiation portion comprises a first strip portion, a second strip portion, and a third strip portion, a first end of the first strip portion is configured for feeding second signals, a second end of the first strip portion is coupled to the third strip portion, a first end of the second strip portion is coupled to the first strip portion, the first strip portion and the second strip portion are both long strip portions, the third strip portion is an L-shaped portion, and the first strip portion and a long side of the third strip portion are form a T-shaped portion.

4. The antenna module of claim 3, wherein the first surface of the substrate further comprises a metal layer, the metal layer comprises a base portion and a connecting portion, the connecting portion is an L-shaped portion, the connecting portion is located in the first clearance area, and a second end of the second strip portion is coupled to an end of the connecting portion.

5. The antenna module of claim 1, wherein the second radiation portion comprises a first rectangular portion, a trapezoidal portion, and a second rectangular portion, the trapezoidal portion is located between the first rectangular portion and the second rectangular portion, an upper bottom of the trapezoidal portion is a long side of the second rectangular portion, and a lower bottom of the trapezoidal portion is a part of a long side of the first rectangular portion.

6. The antenna module of claim 5, wherein the trapezoidal portion comprises two right trapezoidal portions, straight waists of the two right trapezoidal portions are connected, and inclination angles of oblique waists of the two right trapezoidal portions are different.

7. The antenna module of claim 1, wherein the substrate further comprises a second surface opposite to the first surface, the second surface of the substrate comprises a third clearance area and a fourth clearance area, a projection of the first radiation portion on the second surface falls in the third clearance area, and a projection of the fourth clearance area on the first surface falls in the second clearance area.

8. The antenna module of claim 7, wherein the second clearance area is arranged opposite to the fourth clearance area, the fourth clearance area is a rectangular groove arranged on the second surface, and the projection of the fourth clearance area on the first surface overlaps with the second radiating portion.

9. The antenna module of claim 7, wherein the first clearance area is arranged opposite to the third clearance area, the first clearance area and the third clearance area have the same length and width.

10. An electronic device, comprising:

a signal process module; and an antenna module, coupled to the signal process module, wherein the antenna module comprises:

a substrate, a first surface of the substrate comprises a first clearance area and a second clearance area, the first clearance area is located in a first corner area of the first surface, and the second clearance area is located in a second corner area of the first surface;

a first antenna arranged on the substrate, the first antenna comprises a first radiation portion located in the first clearance area; and a second antenna arranged on the substrate, the second antenna comprises a second radiation portion located in the second clearance area;

an antenna type of the first antenna is different from an antenna type of the second antenna, and the first antenna and the second antenna are configured to transmit and receive first signals of the same frequency.

11. The electronic device of claim 10, wherein the first antenna is an inverted-F antenna, and the second antenna is a slot antenna.

12. The electronic device of claim 10, wherein the first radiation portion comprises a first strip portion, a second strip portion, and a third strip portion, a first end of the first strip portion is configured for feeding second signals, a second end of the first strip portion is coupled to the third strip portion, a first end of the second strip portion is coupled to the first strip portion, the first strip portion and the second strip portion are both long strip portions, the third strip portion is an L-shaped portion, and the first strip portion and a long side of the third strip portion are form a T-shaped portion.

13. The electronic device of claim 12, wherein the first surface of the substrate further comprises a metal layer, the metal layer comprises a base portion and a connecting portion, the connecting portion is an L-shaped portion, the connecting portion is located in the first clearance area, and a second end of the second strip portion is coupled to an end of the connecting portion.

14. The electronic device of claim 10, wherein the second radiation portion comprises a first rectangular portion, a trapezoidal portion, and a second rectangular portion, the trapezoidal portion is located between the first rectangular portion and the second rectangular portion, an upper bottom of the trapezoidal portion is a long side of the second rectangular portion, and a lower bottom of the trapezoidal portion is a part of a long side of the first rectangular portion.

15. The electronic device of claim 14, wherein the trapezoidal portion comprises two right trapezoidal portions, straight waists of the two right trapezoidal portions are connected, and inclination angles of oblique waists of the two right trapezoidal portions are different.

16. The electronic device of claim 10, wherein the substrate further comprises a second surface opposite to the first surface, the second surface of the substrate comprises a third clearance area and a fourth clearance area, a projection of the first radiation portion on the second surface falls in the third clearance area, and a projection of the fourth clearance area on the first surface falls in the second clearance area.

17. The electronic device of claim 16, wherein the second clearance area is arranged opposite to the fourth clearance area, the fourth clearance area is a rectangular groove arranged on the second surface, and the projection of the fourth clearance area on the first surface overlaps with the second radiating portion.

18. The electronic device of claim 16, wherein the first clearance area is arranged opposite to the third clearance area, the first clearance area and the third clearance area have the same length and width.

* * * * *